United States Patent
Nakashima et al.

(10) Patent No.: US 10,333,287 B2
(45) Date of Patent: Jun. 25, 2019

(54) CLEARANCE FILLING STRUCTURE OF ACCOMMODATION BOX, ELECTRIC CONNECTION BOX, AND WIRE HARNESS

(71) Applicant: Yazaki Corporation, Tokyo (JP)

(72) Inventors: Akinori Nakashima, Shizuoka (JP); Daisuke Kawada, Shizuoka (JP); Masahiro Wada, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/039,721

(22) Filed: Jul. 19, 2018

(65) Prior Publication Data
US 2019/0123537 A1   Apr. 25, 2019

(30) Foreign Application Priority Data

Oct. 23, 2017 (JP) ................ 2017-204308

(51) Int. Cl.
  *H02G 3/08* (2006.01)
  *H01B 7/00* (2006.01)
(52) U.S. Cl.
  CPC ........... *H02G 3/083* (2013.01); *H01B 7/0045* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 4,940,419 A | * | 7/1990 | Kurita | H01R 13/5213 439/271 |
| 5,674,090 A | * | 10/1997 | Sumida | H01R 9/223 439/535 |
| 5,755,579 A | * | 5/1998 | Yanase | H01R 31/00 439/76.2 |
| 2009/0096132 A1 | | 4/2009 | Yamamoto | |
| 2014/0083733 A1 | * | 3/2014 | Kamigaichi | B60R 16/0239 174/50 |
| 2018/0229673 A1 | * | 8/2018 | Nakano | B60R 16/0207 |
| 2018/0245783 A1 | * | 8/2018 | Brunelli | H02G 3/10 |
| 2018/0263128 A1 | * | 9/2018 | Nakano | H05K 5/0221 |

FOREIGN PATENT DOCUMENTS

JP   2009-100533 A   5/2009

* cited by examiner

*Primary Examiner* — William H. Mayo, III
*Assistant Examiner* — Krystal Robinson
(74) *Attorney, Agent, or Firm* — Sughrue Mion, PLLC (57) ABSTRACT

An accommodation chamber includes an internal wall surface to be disposed to face an accommodation target object at an interval, the accommodation target object includes an external wall surface to be disposed to face the internal wall surface at an interval, one wall surface of the internal wall surface and the external wall surface includes a plurality of projecting portions that project toward another wall surface thereof, and extend along an insertion direction of the accommodation target object to the accommodation chamber, and contact the other wall surface, and the projecting portions are formed so that a demolding direction from a molding die forming the one wall surface corresponds to an extending direction, and the one wall surface is divided into a plurality of regions along the insertion direction.

6 Claims, 10 Drawing Sheets

CLEARANCE FILLING STRUCTURE OF ACCOMMODATION BOX, ELECTRIC CONNECTION BOX, AND WIRE HARNESS

CROSS-REFERENCE TO RELATED APPLICATION(S)

The present application claims priority to and incorporates by reference the entire contents of Japanese Patent Application No. 2017-204308 filed in Japan on Oct. 23, 2017.

BACKGROUND OF THE INVENTION

1. Field of the Invention

The present invention relates to a clearance filling structure of an accommodation box, an electric connection box, and a wire harness.

2. Description of the Related Art

Conventionally, in an accommodation box such as an electric connection box, an accommodation target object accommodated in an accommodation chamber of a casing is held in the chamber, and it is desirable to suppress backlash between the casing in the holding state and the accommodation target object. For example, in Japanese Patent Application Laid-open No. 2009-100533 described below, as a technology of suppressing backlash therebetween, a rib with a height getting higher along an insertion direction of an inner box (that forms an external wall of an accommodation target object), and a rib with a height getting lower along the insertion direction are provided on an inner surface of an outer box (casing). These ribs are extended in a demolding direction of a molding die.

Meanwhile, because the entire rib can be tightly adhered to a counterpart by evening up the height, the rib has a good suppressing effect of backlash. Nevertheless, in view of a demolding work of the molding die, the rib needs to be inclined with a difference in height in an extending direction thereof (insertion direction between the casing and the accommodation target object). Thus, because a difference in height between both ends of the rib becomes larger as a length going along the extending direction becomes longer, even if the rib can be tightly adhered to a counterpart on one end side with a higher height, there is a possibility that the rib can be no longer tightly adhered to the counterpart on another end side with a lower height. For example, in a conventional clearance filling structure, as a length of an installation target wall surface (length in the insertion direction between the casing and the accommodation target object) becomes longer, a length going along the extending direction of the rib needs to be made longer, and a degree adhesion to the counterpart may decline. Thus, in the conventional clearance filling structure, it is difficult to enhance a suppressing effect of backlash.

SUMMARY OF THE INVENTION

Thus, a purpose of the present invention is to provide a clearance filling structure of an accommodation box, an electric connection box, and a wire harness that can enhance a suppressing effect of backlash between a casing and an accommodation target object.

According to an aspect of the present invention, a clearance filling structure of an accommodation box includes: a clearance filling portion that is provided on one of a casing including an accommodation chamber and an opening communicated with the accommodation chamber, and an accommodation target object to be inserted from the opening and accommodated into the accommodation chamber, and is configured to suppress backlash between the accommodation chamber and the accommodation target object at an accommodation completion position. The accommodation chamber includes an internal wall surface to be disposed to face the accommodation target object at an interval when accommodation of the accommodation target object ends, the accommodation target object includes an external wall surface to be disposed to face the internal wall surface at an interval when accommodation to the accommodation chamber ends, one wall surface of the internal wall surface and the external wall surface that are disposed to face each other includes, as the clearance filling portion, a plurality of projecting portions that project toward another wall surface thereof, and extend along an insertion direction of the accommodation target object to the accommodation chamber, and contact the other wall surface, and the projecting portions are formed so that a demolding direction from a molding die forming the one wall surface corresponds to an extending direction, and the one wall surface is divided into a plurality of regions along the insertion direction, and at least one of the projecting portions is provided in each of two or more regions of the plurality of regions.

According to another aspect of the present invention, in the clearance filling structure, the projecting portions may be respectively provided in the mutually different regions are disposed with being shifted from each other in an orthogonal direction to the insertion direction.

According to still another aspect of the present invention, in the clearance filling structure, the projecting portions may be respectively provided in the mutually different regions are disposed side by side in the insertion direction.

According to still another aspect of the present invention, an electric connection box includes: a casing that is configured to accommodate one end side of an electric wire, thereinside, and to draw out another end side of the electric wire to an outside, and includes an accommodation chamber and an opening communicated with the accommodation chamber; an accommodation target object to be inserted from the opening and accommodated into the accommodation chamber; and a clearance filling portion that is provided on one of the accommodation chamber and the accommodation target object, and is configured to suppress backlash between the accommodation chamber and the accommodation target object at an accommodation completion position. The accommodation chamber includes an internal wall surface to be disposed to face the accommodation target object at an interval when accommodation of the accommodation target object ends, the accommodation target object is an electronic component holding member configured to accommodate and hold an electronic component to be electrically connected to one end side of the electric wire, and includes an external wall surface to be disposed to face the internal wall surface at an interval when accommodation to the accommodation chamber ends, one wall surface of the internal wall surface and the external wall surface that are disposed to face each other includes, as the clearance filling portion, a plurality of projecting portions that project toward another wall surface thereof, and extend along an insertion direction of the accommodation target object to the accommodation chamber, and contact the other wall surface, and the projecting portions are formed so that a demolding direction from a molding die forming the one wall surface corresponds to an extending direction, and the one wall surface is divided into a plurality of regions along the insertion direction, and at least one of the projecting portions is provided in each of two or more regions of the plurality of regions.

According to still another aspect of the present invention, a wire harness includes: an electric wire; a casing that is configured to accommodate one end side of the electric wire, thereinside, and to draw out another end side of the electric wire to an outside, and includes an accommodation chamber and an opening communicated with the accommodation chamber; an accommodation target object to be inserted from the opening and accommodated into the accommodation chamber; and a clearance filling portion that is provided on one of the accommodation chamber and the accommodation target object, and is configured to suppress backlash between the accommodation chamber and the accommodation target object at an accommodation completion position. The accommodation chamber includes an internal wall surface to be disposed to face the accommodation target object at an interval when accommodation of the accommodation target object ends, the accommodation target object is an electronic component to be electrically connected to one end side of the electric wire, or an electronic component holding member configured to accommodate and hold the electronic component, and includes an external wall surface to be disposed to face the internal wall surface at an interval when accommodation to the accommodation chamber ends, one wall surface of the internal wall surface and the external wall surface that are disposed to face each other includes, as the clearance filling portion, a plurality of projecting portions that project toward another wall surface thereof, and extend along an insertion direction of the accommodation target object to the accommodation chamber, and contact the other wall surface, and the projecting portions are formed so that a demolding direction from a molding die forming the one wall surface corresponds to an extending direction, and the one wall surface is divided into a plurality of regions along the insertion direction, and at least one of the projecting portions is provided in each of two or more regions of the plurality of regions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a clearance filling structure of an accommodation box, an electric connection box, and a wire harness according to the present invention will be described in detail below based on the drawings. In addition, the present invention is not limited by the embodiment.

Embodiment

One of the embodiments of the clearance filling structure of the accommodation box, the electric connection box, and the wire harness according to the present invention will be described based on FIGS. 1 to 11. In the present embodiment, the description will be given using an electric connection box as an example of the accommodation box.

Figure 1:
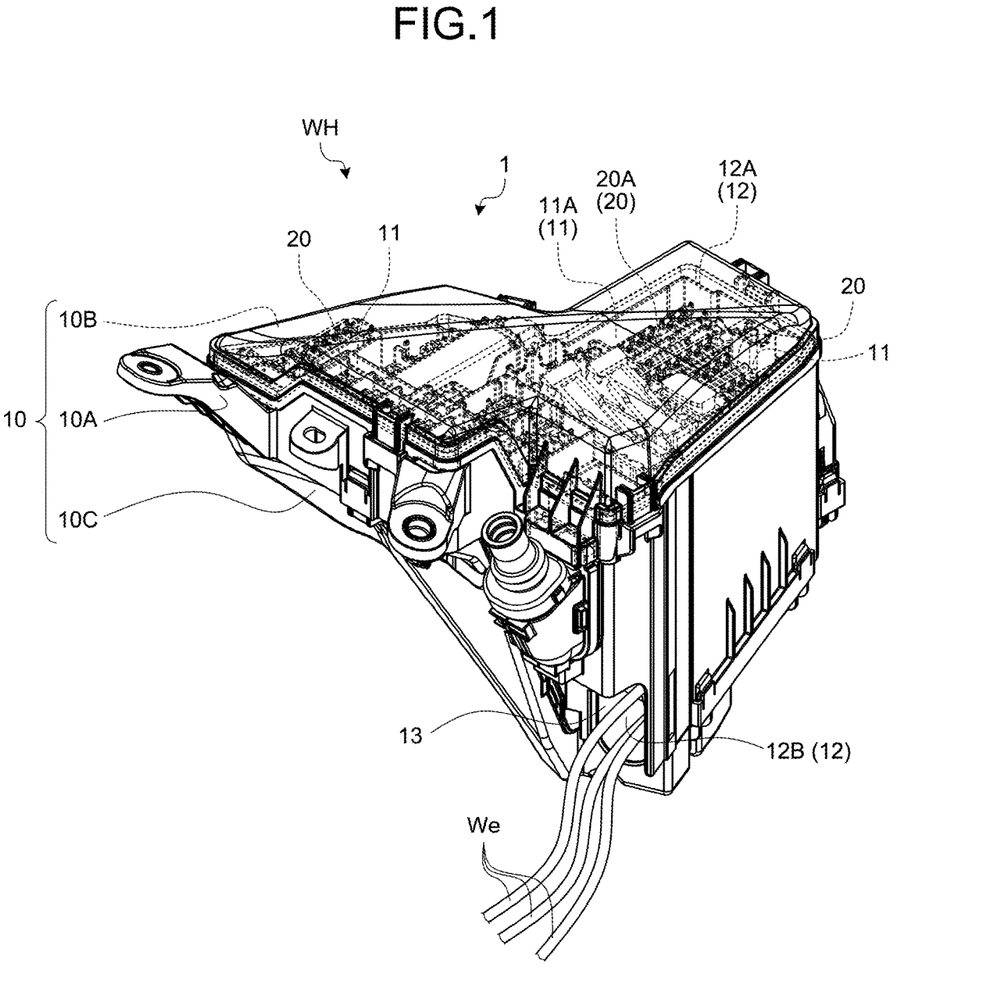
FIG. 1 is a perspective view illustrating an electric connection box and a wire harness of an embodiment, and illustrates a state in which the inside of a casing is viewed in a perspective manner from a second casing member side.

A sign 1 in FIG. 1 denotes an electric connection box of the present embodiment. In addition, a sign WH in FIG. 1 denotes a wire harness of the present embodiment that includes the electric connection box 1.

Figure 2:
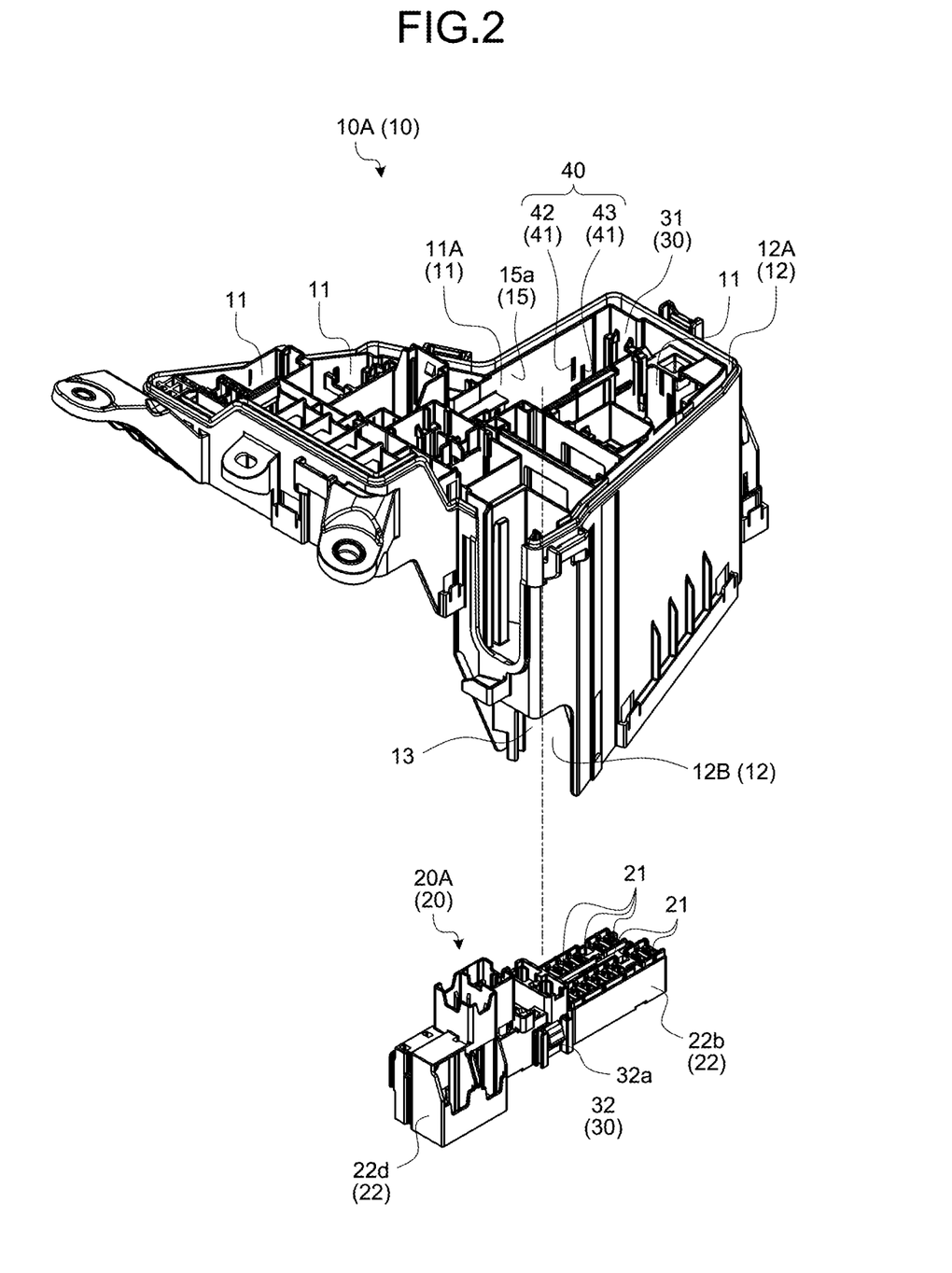
FIG. 2 is a perspective view illustrating a clearance filling structure of an accommodation box of an embodiment, and illustrates a state in which an electronic component holding member is removed from the casing.

The electric connection box 1 of the present embodiment includes a casing 10, and at least one accommodation target object 20 to be accommodated in the casing 10 (FIGS. 1 and 2).

The casing 10 is molded by insulating material such as synthetic resin. The casing 10 includes at least one accommodation chamber 11 (FIGS. 1 and 2). The accommodation chamber 11 is a chamber for accommodating the accommodation target object 20. At least one accommodation target object 20 is accommodated in one accommodation chamber 11. In addition, the casing 10 includes at least one opening 12 communicated with the accommodation chamber 11 (FIGS. 1 and 2). The opening 12 is an insertion port through which the accommodation target object 20 is accommodated into the accommodation chamber 11. In the casing 10, one end side of an electric wire (power supply line, a signal line, etc.) We is accommodated in the inner accommodation chamber 11, and another end side of the electric wire We is drawn out to the outside from the inner accommodation chamber 11. Thus, the casing 10 includes at least one draw-out port 13 for drawing out the electric wire We from the inside to the outside (FIGS. 1 and 2). In addition, in FIG. 1, a part of a plurality of electric wires We is illustrated.

The accommodation target object 20 is inserted from the opening 12, and is accommodated in the accommodation chamber 11. As the accommodation target object 20 in the electric connection box 1, an electronic component to be electrically connected to the one end side of the electric wire We, an electronic component holding member that accommodates and holds the electronic component, or the like can be considered. The electric connection box 1 of the present embodiment includes the casing 10 and includes at least either one of the electronic component and the electronic component holding member as the accommodation target object 20, and electrically connects a connection target object (not illustrated) to the electronic component via the electric wire We. In the electric connection box 1, the electric wire We is electrically connected to the electronic component, inside the casing 10, and the electronic component is electrically connected to the connection target object via the electric wire We drawn out from the inside of the casing 10 to the outside. The electric connection box 1 forms the wire harness WH together with the electric wire We.

Here, the electronic component refers to, for example, a relay, a circuit protection component such as a fuse, a connector, a terminal hardware, or the like. In the present embodiment, an electronic device such as a circuit substrate and an electronic control unit (so-called ECU) is also considered as one configuration of the electronic component. In addition, the connection target object refers to a power source such as a secondary battery, a load on an electronic device or the like (actuator, etc.), a sensor, or the like. In the electric connection box 1, for example, a certain electric wire We is electrically connected to the power source, and an electric wire We different from this is electrically connected to the load, and the power source and the load are electrically connected via the electronic component.

Specifically, the exemplified casing 10 is formed by assembling three members including a first casing member 10A, a second casing member 10B, and a third casing member 10C (FIG. 1).

Figure 3:
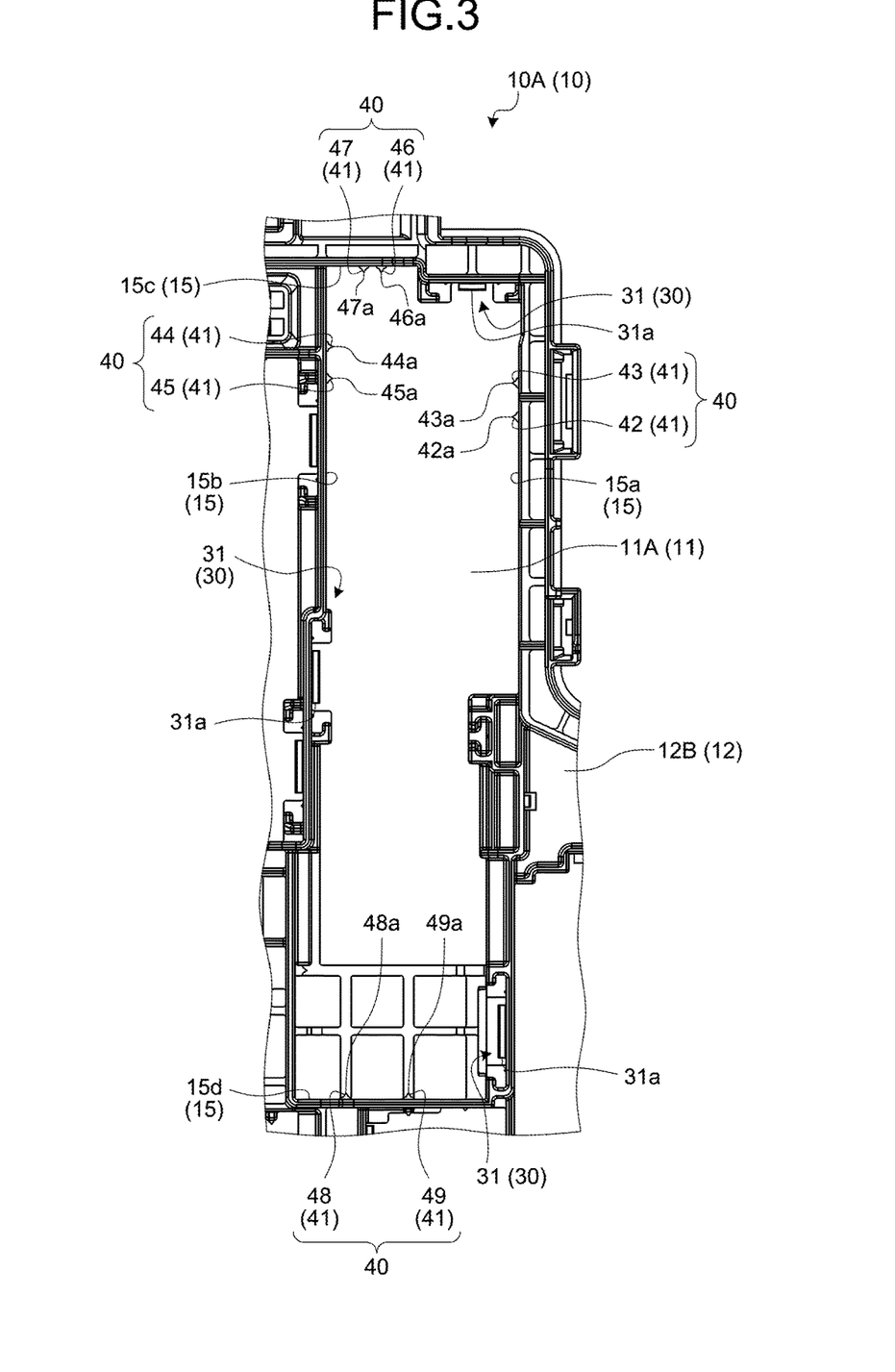
FIG. 3 is a plan view of an accommodation chamber viewed from a second opening side.

The first casing member 10A constitutes a main portion of the casing 10, and includes the accommodation chamber 11 and the opening 12 (FIGS. 1 to 3). The first casing member 10A is a box member including two openings 12 (first opening 12A, second opening 12B) disposed to face each other, at both ends (FIGS. 1 and 2), and is sometimes referred to as a so-called frame. In the first casing member 10A, a plurality of accommodation chambers 11 is formed, and the accommodation target objects 20 are to be accommodated in the respective accommodation chambers 11.

In the first casing member 10A, an electronic component serving as the accommodation target object 20, and an electronic component to be accommodated and held by an electronic component holding member serving as the accommodation target object 20 are inserted from the first opening 12A. On the other hand, the electronic component holding member serving as the accommodation target object 20 is inserted from the second opening 12B. The electric wire We is drawn out from the accommodation chamber 11 via the second opening 12B, and is guided to the draw-out port 13.

The second casing member 10B is a cover member that blocks the first opening 12A, and is attached to the first casing member 10A from the first opening 12A side. In addition, the third casing member 10C is a cover member that blocks the second opening 12B, and is attached to the first casing member 10A from the second opening 12B side.

In this manner, the electric connection box 1 of the present embodiment includes the plurality of accommodation chambers 11 and the plurality of accommodation target objects 20, and the electronic component and the electronic component holding member are accommodated as the accommodation target objects 20. Thus, when the description of a specific example of the electric connection box 1 is given, the electronic component holding member is used as an example of the accommodation target objects 20. Thus, in the following description, the accommodation target object 20 is sometimes referred to as an electronic component holding member 20. Here, one accommodation chamber 11A and an electronic component holding member 20A are focused on (FIGS. 1 and 2).

The electronic component holding member 20A is molded by insulating material such as synthetic resin. The exemplified electronic component holding member 20A is formed so as to be able to accommodate and hold a plurality of electronic components. The electronic component holding member 20A is sometimes referred to as a block, a cassette, and the like. The exemplified electronic component holding member 20A is formed into a rectangular shape, and includes a plurality of accommodation chambers 21 for electronic components (FIGS. 2 and 4).

In the electric connection box 1, the accommodation chamber 11A of the casing 10 includes internal wall surfaces 15 to be disposed to face the electronic component holding member 20A at an interval, when the accommodation of the electronic component holding member 20A ends (FIGS. 2 and 3). In addition, the electronic component holding member 20A includes external wall surfaces 22 to be disposed to face the internal wall surfaces 15 at an interval, when the accommodation into the accommodation chamber 11A ends (FIGS. 2 and 4). In this exemplification, for descriptive purposes, it is assumed that the accommodation chamber 11A includes four internal wall surfaces 15, and the electronic component holding member 20A includes four external wall surfaces 22. Thus, the accommodation chamber 11A includes first to fourth internal wall surfaces 15a-15d (FIG. 3). In the accommodation chamber 11A, the first internal wall surface 15a and the second internal wall surface 15b are disposed to face each other, and the third internal wall surface 15c and the fourth internal wall surface 15d are disposed to face each other. In addition, the electronic component holding member 20A includes first to fourth external wall surfaces 22a-22d disposed to respectively face the first to fourth internal wall surfaces 15a-15d (FIG. 4).

The electronic component holding member 20A is inserted up to an accommodation completion position in the accommodation chamber 11A. The electric connection box 1 includes a holding structure 30 that holds the electronic component holding member 20A at the accommodation completion position (FIGS. 2 to 4). The holding structure 30 is provided between the internal wall surfaces 15 and the external wall surfaces 22 that are disposed to face each other. The holding structure 30 includes a first locking member 31 provided on the internal wall surface 15 (FIG. 3), and a second locking member 32 provided on the external wall surface 22 (FIG. 4). By being disposed so as to lock each other at the accommodation completion position, the first locking member 31 and the second locking member 32 stop motions in a removal direction between the accommodation chamber 11A and the electronic component holding member 20A.

Figure 4:
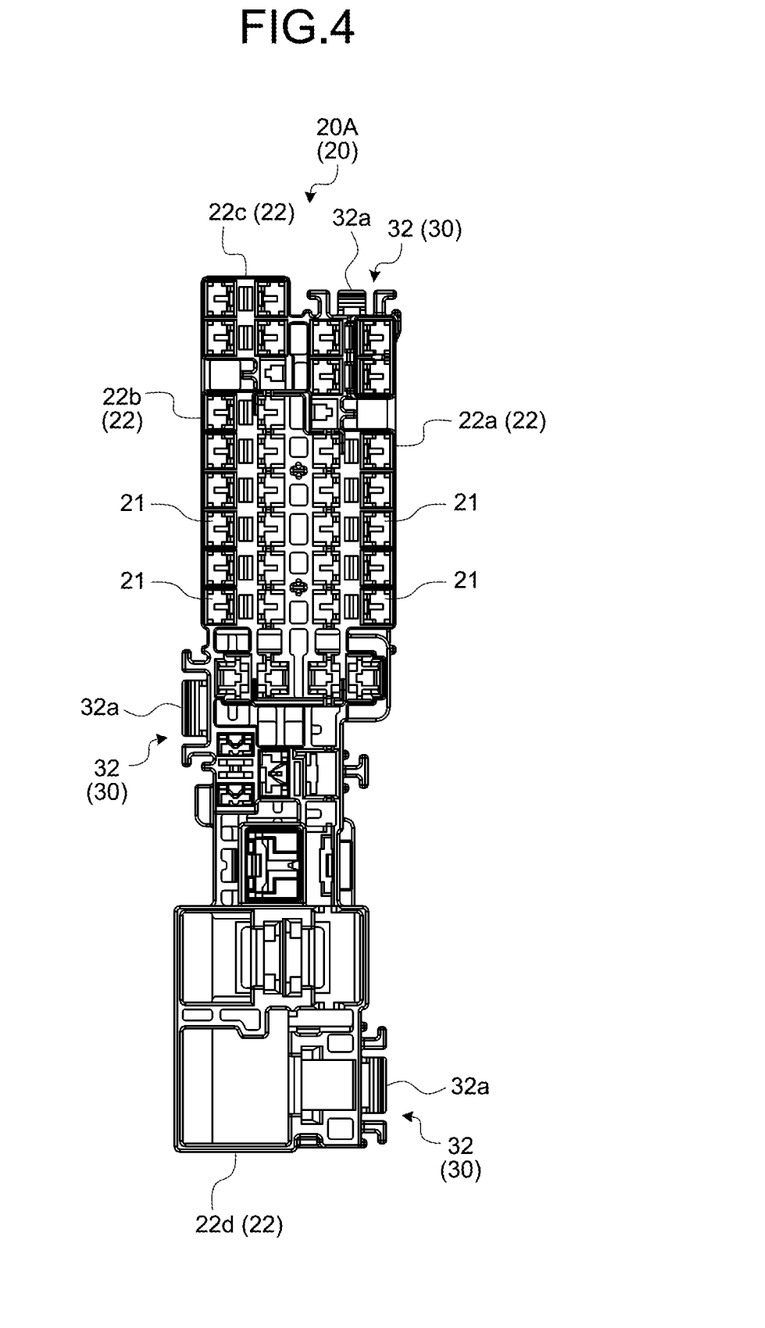
FIG. 4 is a plan view illustrating the electronic component holding member.

The exemplified first locking member 31 and second locking member 32 respectively include claw portions 31a and 32a that can hook each other when insertion of the electronic component holding member 20A to the accommodation completion position ends (FIGS. 3 and 4). By the claw portions 31a and 32a being hooked each other, the first locking member 31 and the second locking member 32 can stop motions in the removal direction between the accommodation chamber 11A and the electronic component holding member 20A. On the other hand, by pushing one of the respective claw portions 31a and 32a, the first locking member 31 and the second locking member 32 release engagement therebetween, and enable removal of the electronic component holding member 20A from the accommodation chamber 11A.

In the exemplification, one holding structure 30 is disposed between the first internal wall surface 15a and the first external wall surface 22a, one holding structure 30 is disposed between the second internal wall surface 15b and the second external wall surface 22b, and one holding structure 30 is disposed between the third internal wall surface 15c and the third external wall surface 22c. In the electric connection box 1, by these holding structures 30, the electronic component holding member 20A can be held in the accommodation chamber 11A at the accommodation completion position.

Meanwhile, for making easy an insertion work of the electronic component holding member 20A with respect to the accommodation chamber 11A, and a removal work of the electronic component holding member 20A, while keeping a holding state of the holding structure 30, a clearance gap (clearance) serving as looseness is provided between the first locking member 31 and the second locking member 32. The clearance of the holding structure 30 leads to backlash between the accommodation chamber 11A and the electronic component holding member 20A at the accommodation completion position. Thus, the electric connection box 1 includes a clearance filling structure 40 that suppresses backlash between the accommodation chamber 11A and the electronic component holding member 20A at the accommodation completion position (FIGS. 2 to 4).

The clearance filling structure 40 includes a clearance filling portion 41 (FIGS. 2 and 3) provided on one of the accommodation chamber 11A and the electronic component holding member 20A, and the other one thereof {another wall surface (the first external wall surface 22a, the second external wall surface 22b, or the third external wall surface 22c) to be described later as a specific example}(FIG. 4), and suppresses generation of backlash by pushing against each other.

For example, one wall surface of the internal wall surface 15 and the external wall surface 22 that are disposed to face each other includes, as the clearance filling portion 41, a plurality of projecting portions that project toward the other wall surface thereof, extend along the insertion direction of the electronic component holding member 20A to the accommodation chamber 11A, and contact the other wall surface (FIG. 3). One wall surface is divided into a plurality of regions S along the insertion direction of the electronic component holding member 20A to the accommodation chamber 11A, and at least one of the projecting portions (the clearance filling portion 41) is provided in each of two or more regions S of the plurality of regions S.

Figure 5:
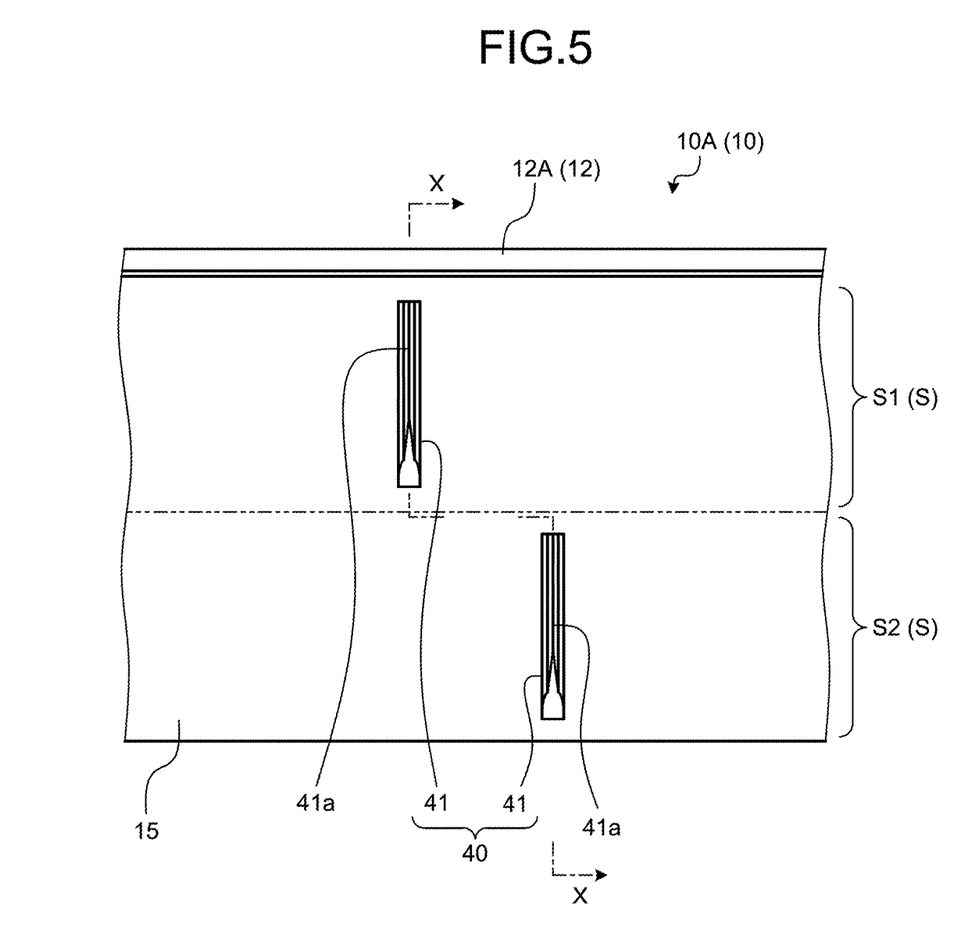
FIG. 5 is a schematic diagram describing a clearance filling portion.
Figure 6:
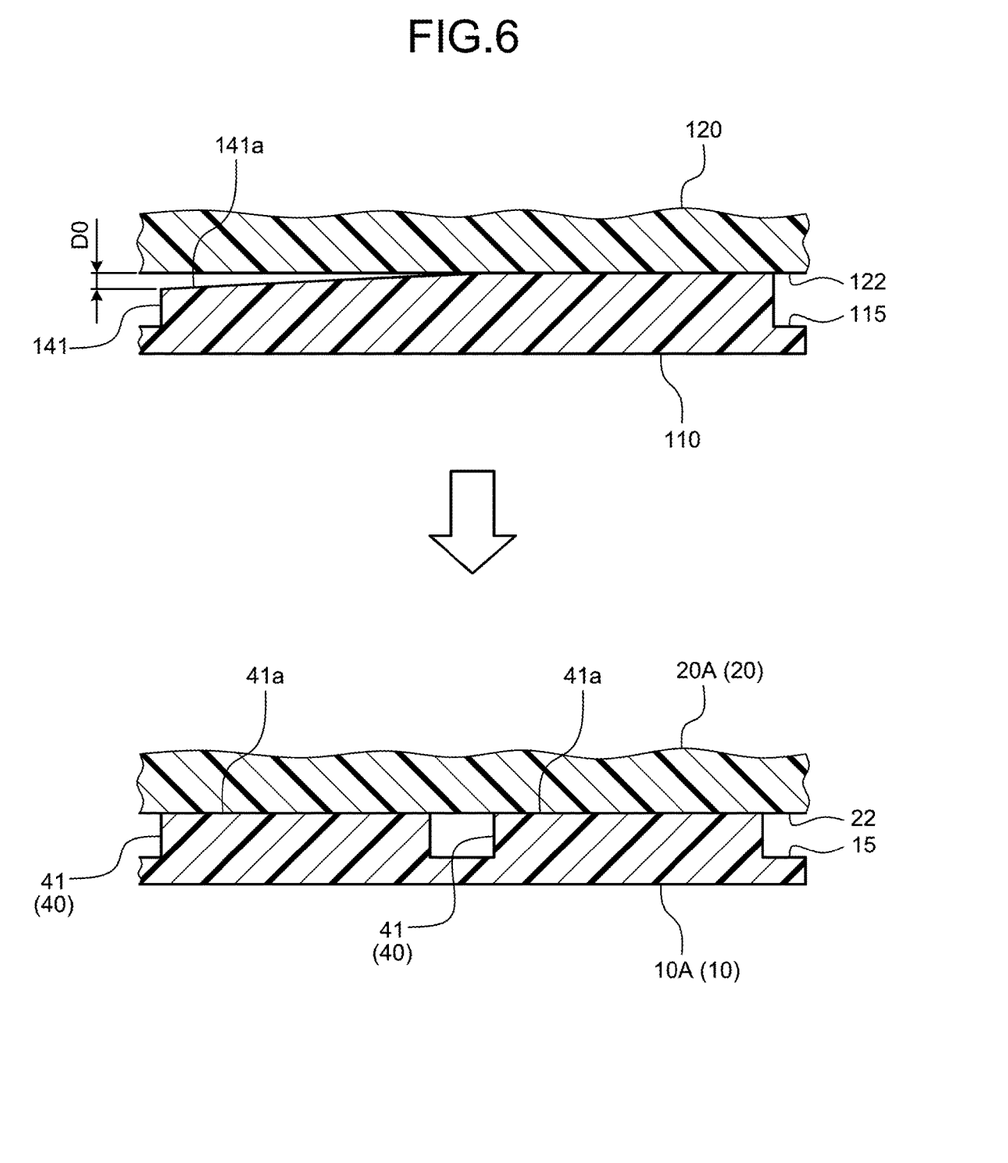
FIG. 6 is an explanatory diagram illustrating an clearance filling portion by comparison with a conventional one, and an upper diagram illustrates a conventional clearance filling portion and a lower diagram illustrates an X-X line cross-sectional view in FIG. 5.

FIG. 5 and the lower diagram in FIG. 6 illustrate, as an example, the division into the regions S, and arrangement of the projecting portions (the clearance filling portions 41) in the plurality of regions S, which are the most simple. In the exemplification in FIG. 5 and the lower diagram in FIG. 6, one wall surface (internal wall surface 15) is divided into two regions S (first region S1, second region S2), and one projecting portion (the clearance filling portion 41) is disposed in each of the regions S. On the other hand, FIGS. 7 to 10 illustrate a specific example of a plurality of regions S and a plurality of projecting portions (clearance filling portions 41) that is applied to the electric connection box 1 of the present embodiment, as described later.

Here, the projecting portions (the clearance filling portions 41) are formed so that a demolding direction from a molding die (not illustrated) forming one wall surface corresponds to the extending direction. In other words, the projecting portions (the clearance filling portions 41) are extended along the insertion direction of the electronic component holding member 20A to the accommodation chamber 11A, between the first opening 12A and the second opening 12B of the first casing member 10A (FIGS. 5 and 7 to 10).

The projecting portions (the clearance filling portions 41) respectively provided in the two different regions S are disposed with being shifted from each other in an orthogonal direction to the insertion direction of the electronic component holding member 20A. In addition, the projecting portions (the clearance filling portions 41) may be disposed side by side in the insertion direction. In addition, a plurality of projecting portions (the clearance filling portions 41) disposed in mutually different regions S with being shifted from each other in the orthogonal direction to the insertion direction of the electronic component holding member 20A, and a plurality of projecting portions (the clearance filling portions 41) disposed in mutually different regions S side by side in the insertion direction of the electronic component holding member 20A may mixedly exist on one wall surface.

Furthermore, a length in the extending direction of the projecting portion (the clearance filling portion 41) may be equal to a length in a width direction (the insertion direction of the electronic component holding member 20A to the accommodation chamber 11A) of the region S in which the projecting portion is disposed, or may be shorter than a length in the width direction.

In addition, furthermore, an end portion in the extending direction of the projecting portion (the clearance filling portion 41) may be extended up to an adjacent region S. Nevertheless, an extending portion of the end portion is set to be shorter than a length in the width direction of the adjacent region S. For example, in a case where one wall surface is divided into two regions S, the extending portion of the end portion desirably has a length that is equal to or smaller than a half of the length in the width direction of the adjacent region S. In contrast to this, in a case where one wall surface is divided into N (N=3) or more regions S, the projecting portion (the clearance filling portion 41) may be provided over a plurality of consecutive regions S (N−1 regions S at most). For example, a length in the extending direction of the projecting portion (the clearance filling portion 41) is set to be equal to a total value of respective lengths in the width direction of the plurality of consecutive regions S. An end portion in the extending direction of the projecting portion (the clearance filling portion 41) may be extended up to an adjacent region S as described above.

For example, in the exemplification in FIG. 5 and the lower diagram in FIG. 6, one projecting portion (the clearance filling portion 41) is disposed in each of the first region S1 and the second region S2 with being shifted from each other in the orthogonal direction to the insertion direction of the electronic component holding member 20A. In addition, the projecting portion (the clearance filling portion 41) is formed to have a length in the extending direction that is substantially equal to a length in the width direction of the first region S1 (second region S2) in which the projecting portion is to be disposed.

Because the projecting portion (the clearance filling portion 41) has a demolding direction from the molding die that corresponds to the extending direction, a peak 41a in a projecting direction from the one wall surface (internal wall surface 15) is inclined along the demolding direction from the molding die. Thus, in the projecting portion (the clearance filling portion 41), there is a difference in height between both ends in the extending direction. If the projecting portion (the clearance filling portion 41) has a length in the extending direction that is similar to that of the conventional one, the difference in height between the both ends generates a clearance gap DO between the peak 41a and the other wall surface (external wall surface 22) at the accommodation completion position (upper diagram in FIG. 6). The upper diagram in FIG. 6 illustrates a relationship between a peak 141a of a conventional clearance filling portion 141 (provided on one wall surface 115 of a casing 110) and another wall surface 122 of an accommodation target object 120.

Nevertheless, because the projecting portion (the clearance filling portion 41) of the present embodiment has a length in the extending direction that is shorter than a length of the one wall surface (internal wall surface 15), a difference in height between both ends in the extending direction can be made smaller than that of the conventional one. Thus, the projecting portion (the clearance filling portion 41) can make a clearance gap between the peak 41a and the other wall surface (external wall surface 22) at the accommodation completion position, shorter than the conventional clearance gap DO (lower diagram in FIG. 6). In particular, the projecting portion (the clearance filling portion 41) in the exemplification is formed so that a cross-section orthogonal to the extending direction has a triangular shape, and one peak 41a of the triangular shape is brought into contact with the other wall surface (external wall surface 22) at the accommodation completion position. Thus, because the peak 41a is squeezed by the other wall surface (external wall surface 22) in accordance with the progress of an accommodation work, at the accommodation completion position, the projecting portion (the clearance filling portion 41) can bring the peak 41a into contact with the other wall surface (external wall surface 22) entirely in the extending direction, and shorten or eliminate a clearance gap between the peak 41a and the other wall surface (external wall surface 22). The lower diagram in FIG. 6 illustrates a case in which the clearance gap is eliminated. In this manner, the clearance filling structure 40 of the present embodiment can enhance a suppressing effect of backlash more than a conventional technology.

A specific example will be described below using FIGS. 7 to 10.

In the exemplification, projecting portions (the clearance filling portions 41) are respectively provided between the first internal wall surface 15a and the first external wall surface 22a, between the second internal wall surface 15b and the second external wall surface 22b, between the third internal wall surface 15c and the third external wall surface 22c, and between the fourth internal wall surface 15d and the fourth external wall surface 22d (FIGS. 3 and 7 to 10). Here, the internal wall surface 15 (the first internal wall surface 15a, the second internal wall surface 15b, the third internal wall surface 15c, or the fourth internal wall surface 15d) serves as one wall surface described above, and the external wall surface 22 (the first external wall surface 22a, the second external wall surface 22b, the third external wall surface 22c, or the fourth external wall surface 22d) serves as another wall surface described above. In other words, here, the projecting portions (the clearance filling portions 41) are respectively provided on the first internal wall surface 15a, the second internal wall surface 15b, the third internal wall surface 15c, and the fourth internal wall surface 15d. In the following description, the internal wall surface 15 will be referred to as one wall surface 15, and the external wall surface 22 will be referred to as another wall surface 22.

Figure 7:
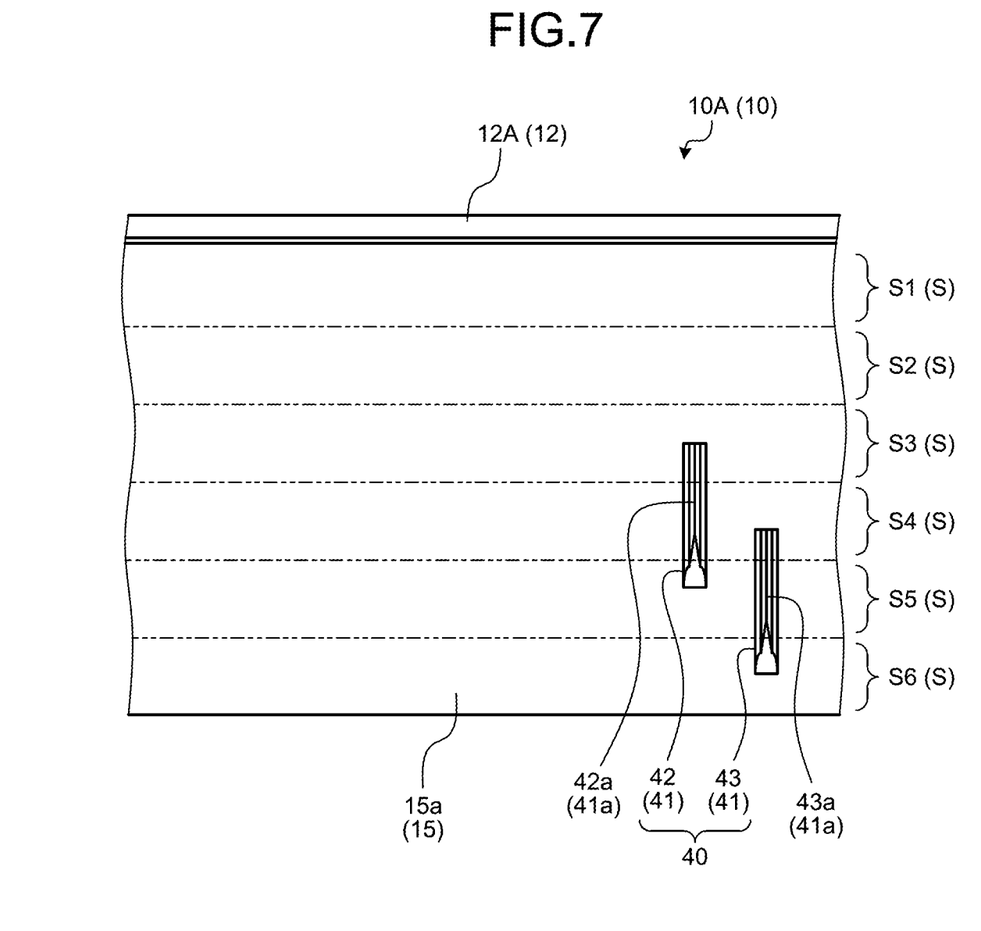
FIG. 7 is a plan view illustrating a clearance filling portion of a first internal wall surface.

The first internal wall surface 15a is divided into first to sixth regions S1-S6 along the insertion direction of the electronic component holding member 20A (FIG. 7). On the first internal wall surface 15a, the regions are disposed from the first opening 12A side, up to the sixth region S6, in the order of the first region S1 and the second region S2. On the first internal wall surface 15a, as the clearance filling portions 41, one first projecting portion 42 and one second projecting portion 43 are respectively provided in the fourth region S4 and the fifth region S5 (FIGS. 2, 3, and 7). In the first projecting portion 42 in the exemplification, one end portion in the extending direction is extended to the adjacent third region S3, and another end portion is extended to the adjacent fifth region S5. In addition, in the second projecting portion 43 in the exemplification, one end portion in the extending direction is extended to the adjacent fourth region S4, and another end portion is extended to the adjacent sixth region S6. The first projecting portion 42 and the second projecting portion 43 are formed so that cross-sections orthogonal to the insertion direction of the electronic component holding member 20A have triangular shapes, and one peaks 42a and 43a of the triangular shapes (FIGS. 3 and 7) are brought into contact with the first external wall surface 22a at the accommodation completion position.

Figure 8:
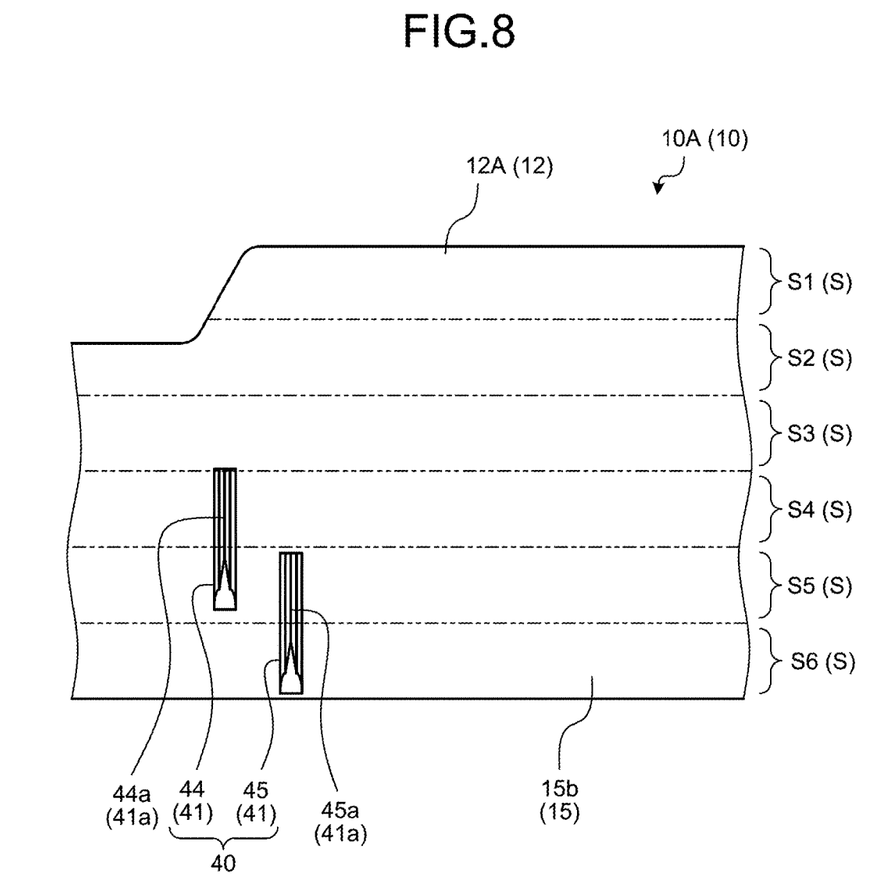
FIG. 8 is a plan view illustrating a clearance filling portion of a second internal wall surface.

Similarly to the first internal wall surface 15a, the second internal wall surface 15b is divided into first to sixth regions S1-S6 along the insertion direction of the electronic component holding member 20A (FIG. 8). On the second internal wall surface 15b, the regions are disposed from the first opening 12A side, up to the sixth region S6, in the order of the first region S1 and the second region S2. On the second internal wall surface 15b, a first projecting portion 44 is provided as the clearance filling portion 41 from the fourth region S4 over the fifth region S5 (FIGS. 3 and 8). The first projecting portion 44 is set to a length that is equal to a total value of respective lengths in the width direction of the fourth region S4 and the fifth region S5. Furthermore, on the second internal wall surface 15b, a second projecting portion 45 is provided as the clearance filling portion 41 from the fifth region S5 over the sixth region S6 (FIGS. 3 and 8). The second projecting portion 45 is set to a length that is equal to a total value of respective lengths in the width direction of the fifth region S5 and the sixth region S6. The first projecting portion 44 and the second projecting portion 45 are formed so that cross-sections orthogonal to the insertion direction of the electronic component holding member 20A have triangular shapes, and one peaks 44a and 45a of the triangular shapes (FIGS. 3 and 8) are brought into contact with the second external wall surface 22b at the accommodation completion position.

Figure 9:
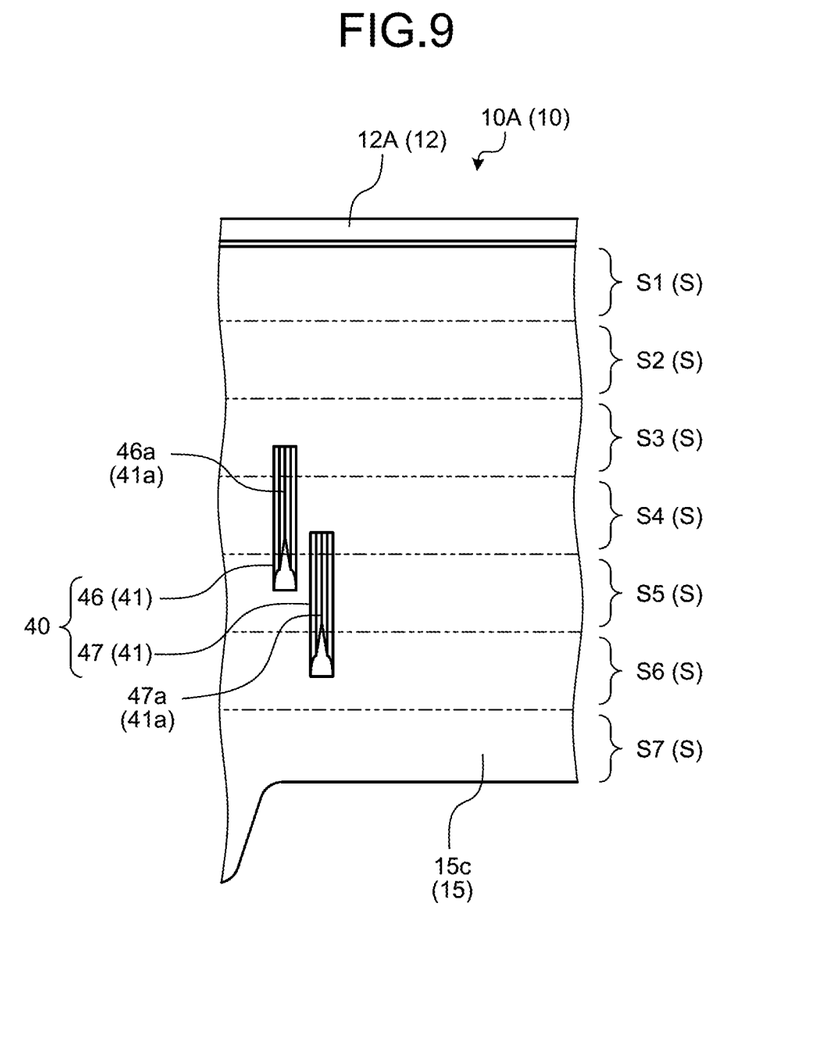
FIG. 9 is a plan view illustrating a clearance filling portion of a third internal wall surface.

The third internal wall surface 15c is divided into first to seventh regions S1-S7 along the insertion direction of the electronic component holding member 20A (FIG. 9). On the third internal wall surface 15c, the regions are disposed from the first opening 12A side, up to the seventh region S7, in the order of the first region S1 and the second region S2. On the third internal wall surface 15c, as the clearance filling portions 41, one first projecting portion 46 and one second projecting portion 47 are respectively provided in the fourth region S4 and the fifth region S5 (FIGS. 3 and 9). In the first projecting portion 46 in the exemplification, one end portion in the extending direction is extended to the adjacent third region S3, and another end portion is extended to the adjacent fifth region S5. In addition, in the second projecting portion 47 in the exemplification, one end portion in the extending direction is extended to the adjacent fourth region S4, and another end portion is extended to the adjacent sixth region S6. The first projecting portion 46 and the second projecting portion 47 are formed so that cross-sections orthogonal to the insertion direction of the electronic component holding member 20A have triangular shapes, and one peaks 46a and 47a of the triangular shapes (FIGS. 3 and 9) are brought into contact with the third external wall surface 22c at the accommodation completion position.

Figure 10:
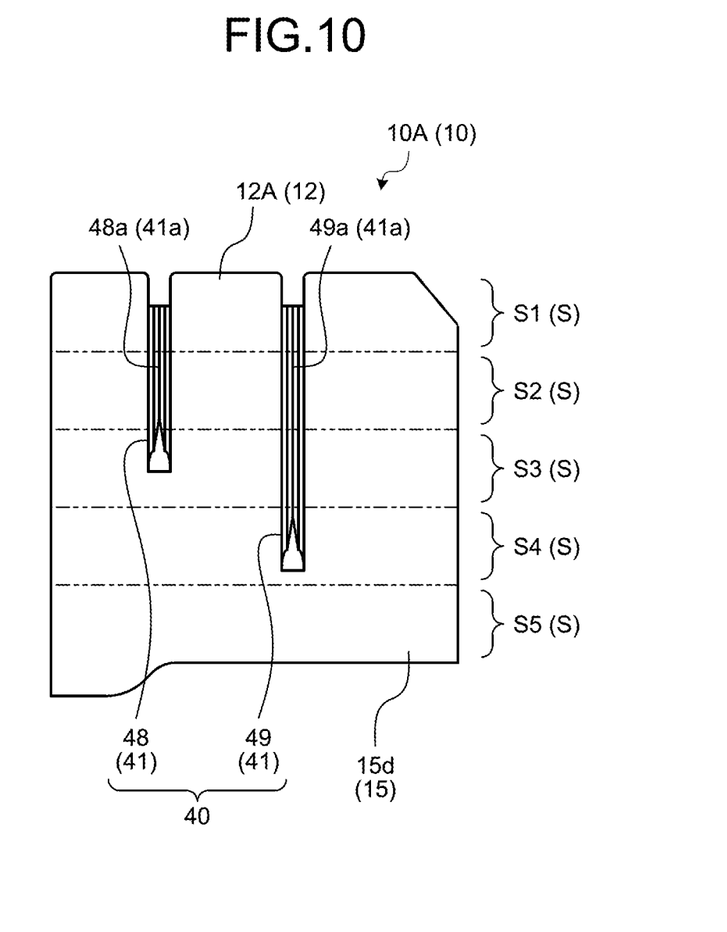
FIG. 10 is a plan view illustrating a clearance filling portion of a fourth internal wall surface.

The fourth internal wall surface 15d is divided into first to fifth regions S1-S5 along the insertion direction of the electronic component holding member 20A (FIG. 10). On the fourth internal wall surface 15d, the regions are disposed from the first opening 12A side, up to the fifth region S5, in the order of the first region S1 and the second region S2. On the fourth internal wall surface 15d, a first projecting portion 48 is provided in the second region S2 as the clearance filling portion 41 (FIGS. 3 and 10). In the first projecting portion 48 in the exemplification, one end portion in the extending direction is extended to the adjacent first region S1, and another end portion is extended to the adjacent third region S3. Furthermore, on the fourth internal wall surface 15d, a second projecting portion 49 is provided as the clearance filling portion 41 from the second region S2 over the fourth region S4 (FIGS. 3 and 10). In the second projecting portion 49 in the exemplification, one end portion in the extending direction is extended to the adjacent first region S1. The first projecting portion 48 and the second projecting portion 49 are formed so that cross-sections orthogonal to the insertion direction of the electronic component holding member 20A have triangular shapes, and one peaks 48a and 49a of the triangular shapes (FIGS. 3 and 10) are brought into contact with the fourth external wall surface 22d at the accommodation completion position.

In this manner, a length in the extending direction of the clearance filling portion 41 (the first projecting portion 42, the second projecting portion 43, the first projecting portion 44, the second projecting portion 45, the first projecting portion 46, the second projecting portion 47, the first projecting portion 48, or the second projecting portion 49) becomes shorter as compared with a length of the one wall surface 15 (the first internal wall surface 15a, the second internal wall surface 15b, the third internal wall surface 15c, or the fourth internal wall surface 15d) (length in a direction going along the insertion direction of the electronic component holding member 20A). For example, in a case where one wall surface 15 is divided into two regions S (first region S1, second region S2), which is the smallest as in the above simple example, a length in the extending direction of the clearance filling portion 41 becomes equal to or smaller than a half of a length of the one wall surface 15. In addition, the length in the extending direction of the clearance filling portion 41 is shorter than the length of one wall surface 15 even if an end portion is extended to the adjacent region S.

In the first casing member 10A, a gradient inclined along the demolding direction is provided for facilitating demolding from the molding die. In the clearance filling portions 41 (the first projecting portion 42, the second projecting portion 43, the first projecting portion 44, the second projecting portion 45, the first projecting portion 46, the second projecting portion 47, the first projecting portion 48, and the second projecting portion 49), their peaks 41a (peaks 42a, 43a, 44a, 45a, 46a, 47a, 48a, and 49a) are inclined along the demolding direction. Thus, in the clearance filling portion 41, as described in the above simple example, there is a difference in height in the projecting direction from one wall surface 15, between both ends in the extending direction.

Nevertheless, because the clearance filling portion 41 of the present embodiment has a length in the extending direction that is shorter than a length of the one wall surface 15, as described above, a difference in height between both ends in the extending direction can be made smaller. Thus, as described in the above simple example, the clearance filling structure 40 of the present embodiment can make a clearance gap between the peak 41a of the clearance filling portion 41 and the other wall surface 22 at the accommodation completion position, shorter than the conventional clearance gap DO. Thus, the clearance filling structure 40 can suppress generation of backlash between the accommodation chamber 11A and the electronic component holding member 20A, more than the conventional technology, when insertion of the electronic component holding member 20A to the accommodation completion position ends. In other words, the clearance filling structure 40 of the present embodiment can enhance a suppressing effect of backlash between the accommodation chamber 11A and the electronic component holding member 20A, more than the conventional technology.

In addition, because the clearance filling structure 40 uses the clearance filling portion 41 having a triangular cross-section orthogonal to the extending direction, the clearance filling structure 40 can squeeze the peak 41a of the clearance filling portion 41 against the other wall surface 22 while inserting the electronic component holding member 20A into the accommodation chamber 11A. Thus, the clearance filling structure 40 can further shorten or eliminate a clearance gap between the peak 41a of the clearance filling portion 41 and the other wall surface 22 at the accommodation completion position. Thus, the clearance filling structure 40 can further enhance a suppressing effect of backlash between the accommodation chamber 11A and the electronic component holding member 20A.

Furthermore, in a case where a suppressing effect of backlash is not desirable, the clearance filling structure 40 of the present embodiment can shorten a length or heighten a height of only the clearance filling portion 41 that serves as a factor of backlash. In other words, the clearance filling structure 40 has a higher degree of freedom in design than that in the conventional technique, and fine adjustment of clearance filling can be performed more easily.

Meanwhile, because a length in the extending direction of the clearance filling portion 41 depends on a length of the one wall surface 15, a difference in height between both ends of the clearance filling portion 41 becomes larger depending on the length of the one wall surface 15. Thus, in a case where a suppressing effect of backlash is not desirable, the clearance filling structure 40 of the present embodiment can shorten a difference in height between both ends of the clearance filling portion 41 by further performing finer division of regions S, for example.

As described above, because the clearance filling structure 40 of an accommodation box of the present embodiment can effectively suppress backlash between the casing 10 and the accommodation target object 20, the clearance filling structure can enhance a suppressing effect of the backlash. In addition, because the electric connection box 1 and the wire harness WH of the present embodiment include the clearance filling structure 40, an effect of the clearance filling structure 40 can be caused.

In the clearance filling structure of an accommodation box according to the embodiment, because a length in the extending direction of a projecting portion becomes shorter than a length of one wall surface, a difference in height between both ends in the extending direction can be made smaller. Thus, the clearance filling structure can make a clearance gap between the projecting portion and another wall surface at the accommodation completion position, shorter than that in the conventional technology, or can eliminate the clearance gap. Thus, the clearance filling structure can suppress inclination between the accommodation chamber and the accommodation target object and suppress generation of backlash therebetween, when insertion of the accommodation target object to the accommodation completion position ends. In this manner, because the clearance filling structure of an accommodation box according to the present invention can effectively suppress backlash between the casing and the accommodation target object, the clearance filling structure can enhance a suppressing effect of the backlash. In addition, because the electric connection box and the wire harness according to the present invention include the clearance filling structure, an effect of the clearance filling structure can be caused.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A clearance filling structure of an accommodation box, the clearance filling structure comprising:
   a clearance filling portion that is provided on one of a casing including an accommodation chamber and an opening communicated with the accommodation chamber, and an accommodation target object to be inserted from the opening and accommodated into the accommodation chamber, and is configured to suppress backlash between the accommodation chamber and the accommodation target object at an accommodation completion position, wherein
   the accommodation chamber includes an internal wall surface to be disposed to face the accommodation target object at an interval when accommodation of the accommodation target object ends,
   the accommodation target object includes an external wall surface to be disposed to face the internal wall surface at an interval when accommodation to the accommodation chamber ends,
   one wall surface of the internal wall surface and the external wall surface that are disposed to face each other includes, as the clearance filling portion, a plurality of projecting portions that project toward another wall surface thereof, and extend along an insertion direction of the accommodation target object to the accommodation chamber, and contact the other wall surface,
   the projecting portions are formed so that a demolding direction from a molding die forming the one wall surface corresponds to an extending direction, and the one wall surface is divided into a plurality of regions along the insertion direction, and
   respective centers of the projecting portions, in the insertion direction, are respectively provided in mutually different regions of the plurality of regions.

2. The clearance filling structure of an accommodation box according to claim 1, wherein
   the projecting portions are shifted from each other in an orthogonal direction to the insertion direction.

3. The clearance filling structure of an accommodation box according to claim 1, wherein
   the projecting portions are disposed end by end in the insertion direction.

4. The clearance filling structure of an accommodation box according to claim 1, wherein
   the projecting portions each comprise a peak that is configured to contact the other wall surface, the peak having a height in a direction in which the projecting portions project toward the other wall surface, and
   the height of the peak increases along the insertion direction.

5. An electric connection box comprising:
   a casing that is configured to accommodate one end side of an electric wire, thereinside, and to draw out another end side of the electric wire to an outside, and includes an accommodation chamber and an opening communicated with the accommodation chamber;
   an accommodation target object to be inserted from the opening and accommodated into the accommodation chamber; and
   a clearance filling portion that is provided on one of the accommodation chamber and the accommodation target object, and is configured to suppress backlash between the accommodation chamber and the accommodation target object at an accommodation completion position, wherein
   the accommodation chamber includes an internal wall surface to be disposed to face the accommodation target object at an interval when accommodation of the accommodation target object ends,
   the accommodation target object is an electronic component holding member configured to accommodate and hold an electronic component to be electrically connected to one end side of the electric wire, and includes an external wall surface to be disposed to face the internal wall surface at an interval when accommodation to the accommodation chamber ends,
   one wall surface of the internal wall surface and the external wall surface that are disposed to face each other includes, as the clearance filling portion, a plurality of projecting portions that project toward another wall surface thereof, and extend along an insertion direction of the accommodation target object to the accommodation chamber, and contact the other wall surface, and
   the projecting portions are formed so that a demolding direction from a molding die forming the one wall surface corresponds to an extending direction, and the one wall surface is divided into a plurality of regions along the insertion direction, and
   respective centers of the projecting portions, in the insertion direction, are respectively provided in mutually different regions of the plurality of regions.

6. A wire harness comprising:
   an electric wire;
   a casing that is configured to accommodate one end side of the electric wire, thereinside, and to draw out another end side of the electric wire to an outside, and includes an accommodation chamber and an opening communicated with the accommodation chamber;
   an accommodation target object to be inserted from the opening and accommodated into the accommodation chamber; and
   a clearance filling portion that is provided on one of the accommodation chamber and the accommodation target object, and is configured to suppress backlash between the accommodation chamber and the accommodation target object at an accommodation completion position, wherein
   the accommodation chamber includes an internal wall surface to be disposed to face the accommodation target object at an interval when accommodation of the accommodation target object ends, the accommodation target object is an electronic component to be electrically connected to one end side of the electric wire, or an electronic component holding member configured to accommodate and hold the electronic component, and includes an external wall surface to be disposed to face the internal wall surface at an interval when accommodation to the accommodation chamber ends, one wall surface of the internal wall surface and the external wall surface that are disposed to face each other includes, as the clearance filling portion, a plurality of projecting portions that project toward another wall surface thereof, and extend along an insertion direction of the accommodation target object to the accommodation chamber, and contact the other wall surface, the projecting portions are formed so that a demolding direction from a molding die forming the one wall surface corresponds to an extending direction, and the one wall surface is divided into a plurality of regions along the insertion direction, and respective centers of the projecting portions, in the insertion direction, are respectively provided in mutually different regions of the plurality of regions.

* * * * *